United States Patent [19]

Reiniger

[11] 4,440,635

[45] Apr. 3, 1984

[54] PROCESS AND APPARATUS FOR THE RECOVERY OF CELLULOSE FIBERS FROM PAPER-PLASTIC MIXTURES

[75] Inventor: Haigh M. Reiniger, 320 Standish St., South Duxbury, Mass. 06901

[73] Assignees: Haigh M. Reiniger, Old Lyme; Toste W. Moller, Rowayton, both of Conn. ; a part interest

[21] Appl. No.: 231,263

[22] Filed: Feb. 3, 1981

Related U.S. Application Data

[63] Continuation of Ser. No. 25,010, Mar. 29, 1979, abandoned.

[51] Int. Cl.³ .............................................. B02C 23/14
[52] U.S. Cl. .......................................... 209/4; 209/12; 209/32; 209/306; 241/24; 241/79.1; 241/86.1; 241/DIG. 38
[58] Field of Search ...................... 209/3, 4, 12, 32, 33, 209/245, 273, 306; 241/19–21, 24, 28, 74, 79, 79.1, 86.1, 188 R, 154, DIG. 38

[56] References Cited

U.S. PATENT DOCUMENTS 3,856,217 12/1974 Brewer ................................ 241/79.1
4,072,273 2/1978 Reiniger ................................. 241/24
4,160,722 7/1979 Marsh ............................... 241/20 X

FOREIGN PATENT DOCUMENTS

2547008 5/1976 Fed. Rep. of Germany ... 241/188 R

Primary Examiner—Ralph J. Hill
Attorney, Agent, or Firm—Roland T. Bryan

[57] ABSTRACT

A process, and apparatus for recovering cellulose fibers from contaminated paper-plastic mixtures by exposing the mix to controlled wetting to increase the weight of paper cellulose components relative to the weight of the plastic components; subjecting the wetted mixture to abrasive forces to fiberize the paper component and then separating the fiberized paper cellulose product from the plastics and other contaminants, to yield several classified products showing distinctly improved quality.

34 Claims, 6 Drawing Figures

PROCESS AND APPARATUS FOR THE RECOVERY OF CELLULOSE FIBERS FROM PAPER-PLASTIC MIXTURES

This application is a continuation of application Ser. No. 025,010, filed Mar. 29, 1979, now abandoned.

BACKGROUND OF THE INVENTION

1. Field of the Invention

This invention relates to the classification of paper from a variety of contaminated paper-plastic mixtures from miscellaneous sources. More specifically for example, this invention relates to the recovery of high grade paper fibers from municipal solid waste (hereinafter MSW) which includes municipal household garbage and trash and includes such trash as is normally collected by a municipality, as for example, household garbage and trash, household yard trash, commercial trash from retail establishments, apartments, offices and warehouses. In addition, this invention relates to a classification method to recover valuable materials from selected wastes such as vegetable fibers, paperboards, agricultural and industrial cellulose materials as well as old corrugated boxes from supermarkets, wadding and molded pulps.

This invention finds particular utility for classicfication of valuable fibers from the "light weight fraction" of MSW herein after LW-MSW which is composed of mainly papers, textiles, and plastics. The light weight fraction of the MSW is defined as trash MSW which has been first prepared to remove heavy materials such as stones, iron or other metal objects, glass, carpeting, construction debris, wire, rubber, tires, and white goods.

Such materials are removed by solid waste crushing and shredding followed by use of rotary or flat screens, magnets, or otherwise. The present invention enables the recovery of the paper fibers from contaminated paper-plastic mixtures such that the paper cellulose fibers are refined and suitable for direct repulping by paper mills into commercial grade papers, including paper products, molded fibers, building materials, and the like. In addition this product is a suitable fuel. This process also produces other classified products which are suitable fuels and have other uses.

2. Description of the Prior Art

Various attempts have been made to find uses for the light weight fraction of MSW. Air classifiers of various types have been employed which have attempted to recover useable cellulose fibers. Such process provides a cellulose product having limited use since it is contaminated in significant amounts with plastics and other contaminants which can be used only for low grade products such as soil conditioners or fuel.

Other prior art processes have attempted to directly repulp in water the MSW or plastic-paper mixture recovered from MSW. Such process have proved ineffective because of the extreme difficulty in separating the plastics and contaminants from the paper fraction. An example of such a prior art process, which recovered low grade plastic contaminated paper confetti from a paper-plastic mixture, is found in my application Ser. No. 427,301 filed Jan. 7, 1974. Therein combined air classifications were used following steady cooking of the mix followed by drying by forced hot air to attempt reaching a cleaned paper fiber product.

SUMMARY OF THE INVENTION

It is an object of the present invention to provide a process for recovering cellulose fibers directly from the light weight fraction of MSW which overcomes the disadvantages of known apparatus for paper recovery from MSW.

It is a further object of the present invention to provide an improved process for separating and classifying the components of a paper-plastic mixture.

It is a further object of the present invention to provide a process for recovering cellulose fibers from MSW without adding of heat or steam cooking or heavy uncontrolled wetting.

Another object of the present invention is to provide a process for recovering cellulose fibers from MSW by using low expenditure of power per ton of recovered product.

Another object of the present invention is to provide an apparatus for recovering cellulose fibers from the light weight fraction of MSW which overcomes the disadvantages of the prior art.

Another object of the present invention is to provide a coordinated continuous machine for recovering cellulose fibers directly from the light weight fraction of MSW.

Another object of the present invention is to provide an apparatus capable of classifying mixed feedable materials of differing weights.

Still another object of the present invention is to recover a classified high test cellulose fiber from the light weight fraction of MSW for use in fiberboards, building boards and molded cabinets, cases, pallets and the like.

A further object of the present invention is to provide a fiberized cellulose suitable for direct recycling to make commercial grade folding boxboard and other paper pulp products such as paper tubes, egg cartons and the like.

Another object of the present invention is to provide a substantially glass free defibered cellulose feed for manufacturing into products demanding a low ash content including relatively high BTU Fuel Products.

Another object of the present invention is to provide a high purity plastic recovered from MSW.

Other objects, aspects and advantages of the present invention will be apparent from the detailed description and the accompanying drawings.

The present invention provides a process and apparatus for difficult recovery of a cellulose paper product from a contaminated paper-plastic mixture by exposing the mixture to controlled wetting to increase the weight of the paper component; subjecting the wetted mixture to reduction forces to fiberize and refine the paper component and then separating the wet, fiberized paper from the plastic and other contaminant.

In addition, the invention provides a cellulose product recovered from MSW having a high cellulose content suitable direct repulping to paper; a plastic product of high plastic content, and a mixed plastic-paper product of low ash content which is suitable for use as a clean fuel.

While this invention has utility in separating any paper-plastic mixture it has particular utility when the infeed is the light weight fraction of MSW which has been chopped to a size of between 2" to about 6". A controlled amount of fluid is added to the chopped paper-plastic mixture which is preferentially absorbed by the paper.

Controlled amounts of water are added as required to the paper-plastic mixture either by a spray shower in a tumbler, or by other suitable means. The water is then more rapidly absorbed by the paper fractions making the paper portions substantially heavier than the plastic and prepared for separation. A separating means is provided to separate the prepared heavier papers from the remaining mixture.

An effective separation according to the process of the subject invention has been achieved by feeding treated mixtures into a rotor chamber in which the paper is classified and separated from the paper-plastic mixture by subjecting it to a fluidized centrifugal zone of treatment wherein such zone contains rotor chambers provided with low pressure air means to create a low air pressure area within a portion of the rotor chamber. The specific gravity differentials between the paper fractions and the other components are exaggerated under centrifugal forces, and controlled air streams.

When the wet paper-plastic mixture is subjected to this fluidized centrifugal zone, the paper tends to promptly fiberize resulting in smaller refined particles of paper. This further aids in separation of paper fibers from plastics since there is no corresponding reduction in the size of the plastic film, foam, or sheets which remain oversized.

A cylindrical rotor chamber is employed to form the fluidized centrifugal field. The rotor chamber has rotor blades acting as a fan throughout its length. A classifier screen surrounds the rotor blades and is dimensioned for passage of the reduced fiberized paper.

A blower and suitable duct means are provided below the rotor to channel high velocity air past the bottom of the rotor to create further low pressure areas within the rotor zone thereby providing a downward suction on the plastic and oversize feed as it falls through the rotor chamber and into the discharge air stream.

The paper-plastic mixture preferably the light fraction of MSW is chopped to a size of between 2" and 6" and treated with a controlled amount of water. This wetted mixture is then fed continuously into the top of the rotor chamber. The spinning fan blades impact the feed against a classifier screen. During this process, the wet paper becomes fiberized which results in the paper breaking into cellulose fibers of a sufficiently small size to pass through the screen openings. There is no corresponding reduction in the size of the plastic fraction. The openings in the classifier screen are dimensioned especially for the passage of paper fractions. When the mixture is fed into the rotor, the moisturized paper is preferentially ejected through the classifier screen while plastics and oversize contaminants clear through the rotor chamber into the discharge air stream.

The preferred embodiment of the present invention is illustrated in the drawings. However, it should be expressly understood that the present invention should not be limited solely to the illustrative embodiment. As for example, the uniform treating and feeding, two stage presizing and reduction, two or three stage dispersion of moisture and additives, and the removal of a variety of contaminants within the rotor classification zone all are contemplated to be within the scope and purview of subject invention.

DETAILED DESCRIPTION OF THE INVENTION

Figure 1:
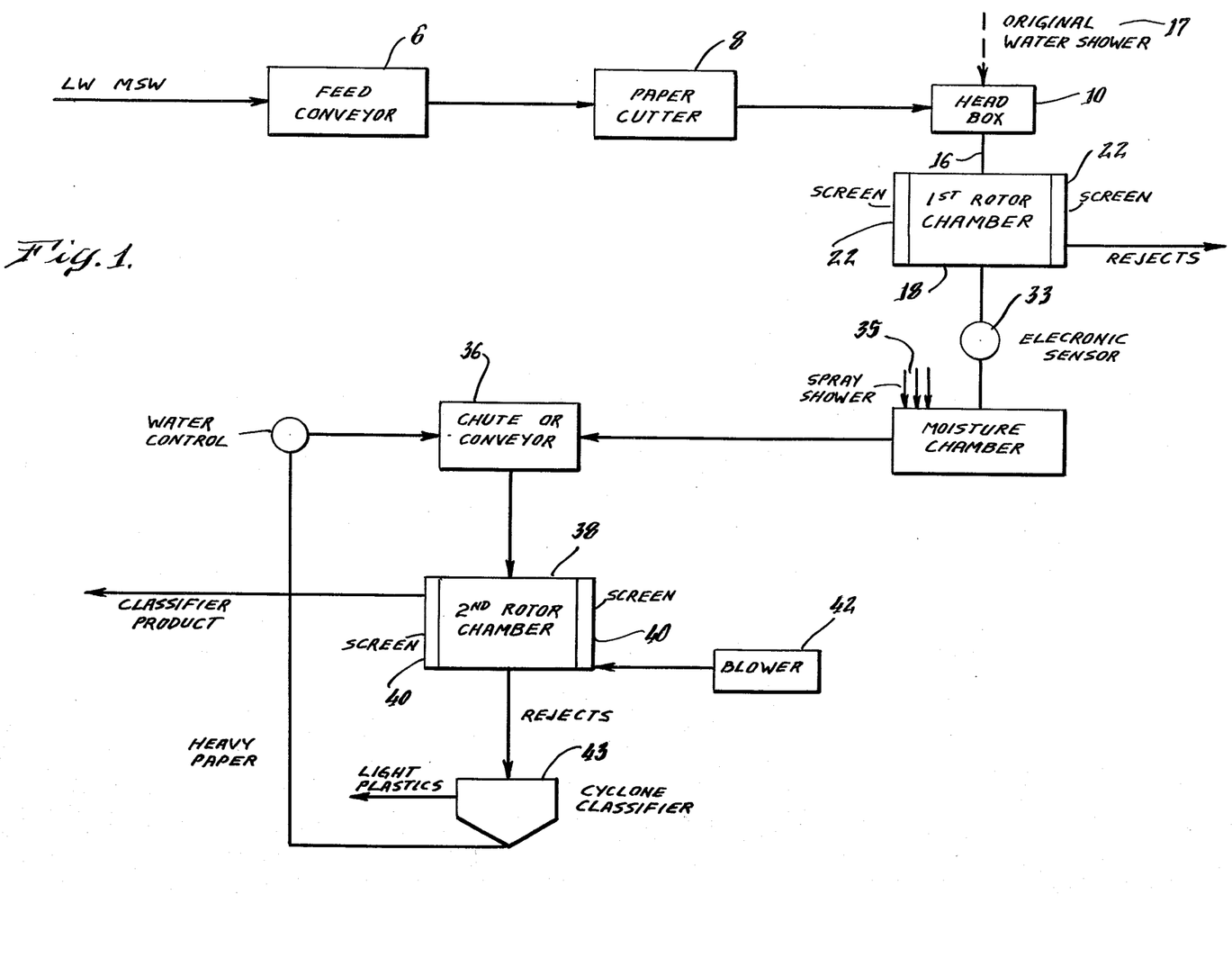
FIG. 1 is a block diagram of the preferred embodiment of the subject invention.

The process of the invention can be best followed with reference to the block diagram of FIG. 1. The light weight fraction of MSW, that is MSW in which the primary steps of crushing and shredding or other separation means such as screening and chopping have been performed to remove substantially all the heavy material as well as metals and which is substantially free of heavy materials, such as stones, iron, or other metal objects, glass, carpeting, construction debris, wire, rope, rubber, tires and white goods is continuously fed to a feed conveyor 6 which feeds the LW-MSW to a paper cutter 8 which cuts the LW-MSW to a size of about 2 inches. The chopped material is then fed to a head box 10 which is a container having a belt conveyor 16 at the bottom and is adapted to feed a metered amount of LW-MSW to the first stage rotor chamber 18. There are optional water showers 17 at the top of the head box to control the moisture content of the infeed and for dust control purposes. The LW-MSW is then fed to a first rotor chamber 18 which subjects the LW-MSW to a ballistic attrition wherein glass, grit, paper embedded with sand and degraded or short fibers or those that are saturated or contaminated are separated from the mix. This preliminary attrition stage separates and classifies gross contaminants from the plastics and high strength papers based on particle size and the action of the rotor creates centrifugal forces which cause heavier particles to fly through the classifier screen 22. Such heavier particles include glass, grit, degraded vegetable matter and heavily contaminated papers which become further degraded and discharged. The remaining LW-MSW portion falls through the rotor chamber 18 into the moisture control chamber 32. Any means of introducing a controlled amount of moisture is acceptable such as spray showers 35 introducing a controlled amount of moisture with a chute or tumbler.

Conventional moisture sensors 33 monitor the moisture content of the feed. Moisture differential is a significant, aspect of this invention. This process is controlled semi-dry process for the classification of fiberized cellulose fibers from contaminated paper-plastic mixtures.

The average paper content in LW-MSW is generally between 45 and 65% by weight. The remainder of the feed contains large amounts of plastics. The initial moisture content of the LW-MSW generally ranges between 10% and 35% EMC (equilibrium moisture content) by weight oven-dry basis. According to this invention the moisture content of the feed to the rotor chamber 38 is usually raised by 3 to 10% by weight. Preferably the moisture of the feed as it enters rotor chamber 38 should be between 20% and 35% EMC oven-dry basis and most preferably at 25%. It should be noted that during the first rotor chamber treatment the feed drys considerably; thus, it is usually possible to process in the second rotor chamber at the optimum moisture content even if the feed was initially somewhat wetter than 25%. If the moisture content of the feed to the first rotor chamber 18 is less than 15%, an initial adjustment is made in the moisture content by liquid addition to increase the moisture content to the first rotor chamber to 18 to 20%.

It should be further noted that if the feed is composed of heavy papers such as Kraft that a higher average moisture level would be desirable. This factor is attributable to the great absorbancy of the flutes corrugated medium containing short fibers, and the non-absorbancy characteristics encountered in fiberizing heavy kraft liners.

When the moisture content is too low, the yield of recovered paper decreases. If the water content is too high the LW-MSW tends to clog classifier screens. Thus, although the 15% to 35% range is optimum for most plastic paper mixtures derrived from MSW, the yield vs. clogging tendencies of the feed are monitored. As indicated above, where there is a high percentage of heavy paper, such as Kraft paper, the moisture content may reach up to 60% of paper moisture content by weight.

The rate of moisture absorbtion of the paper results in a marked differential between the paper components and weight of other materials in the feed, especially the plastic. The moisture treated LW-MSW is fed by suitable feeding means such as a chute or conveyor 36 to a second rotor chamber 38 which subjects the moisture treated LW-MSW to a fluidized centrifugal field causing rapid separation of the wetted paper. The wetted paper begins to fiberize quickly in the rotor chamber 38 due to the attrition action thereby becoming smaller in size than the remaining plastics, textiles, tapes, and other contaminants, and thus facilitating separation. A classifier screen surrounds the second rotor chamber and is selectively dimensioned for the passage of particles of fiberized paper. Thus the cellulose fibers and paper particles are removed through the classifier screen 40. The accepted classification product is then bailed and shipped to paper mills for direct repulping and reuse.

A blower 42 supplies a high velocity air stream across the bottom of the rotor chamber at an angle of about 90° to the axis of the discharge of the rotor chamber. This air stream creates an adjustable low pressure area under and within the rotor chamber 38 thus preventing the lower chamber from acting as an upward air intake. Thus the air flow through the rotor is carefully controlled from the infeed at the top and out through the openings in the classifier screen 40.

Figure 2:
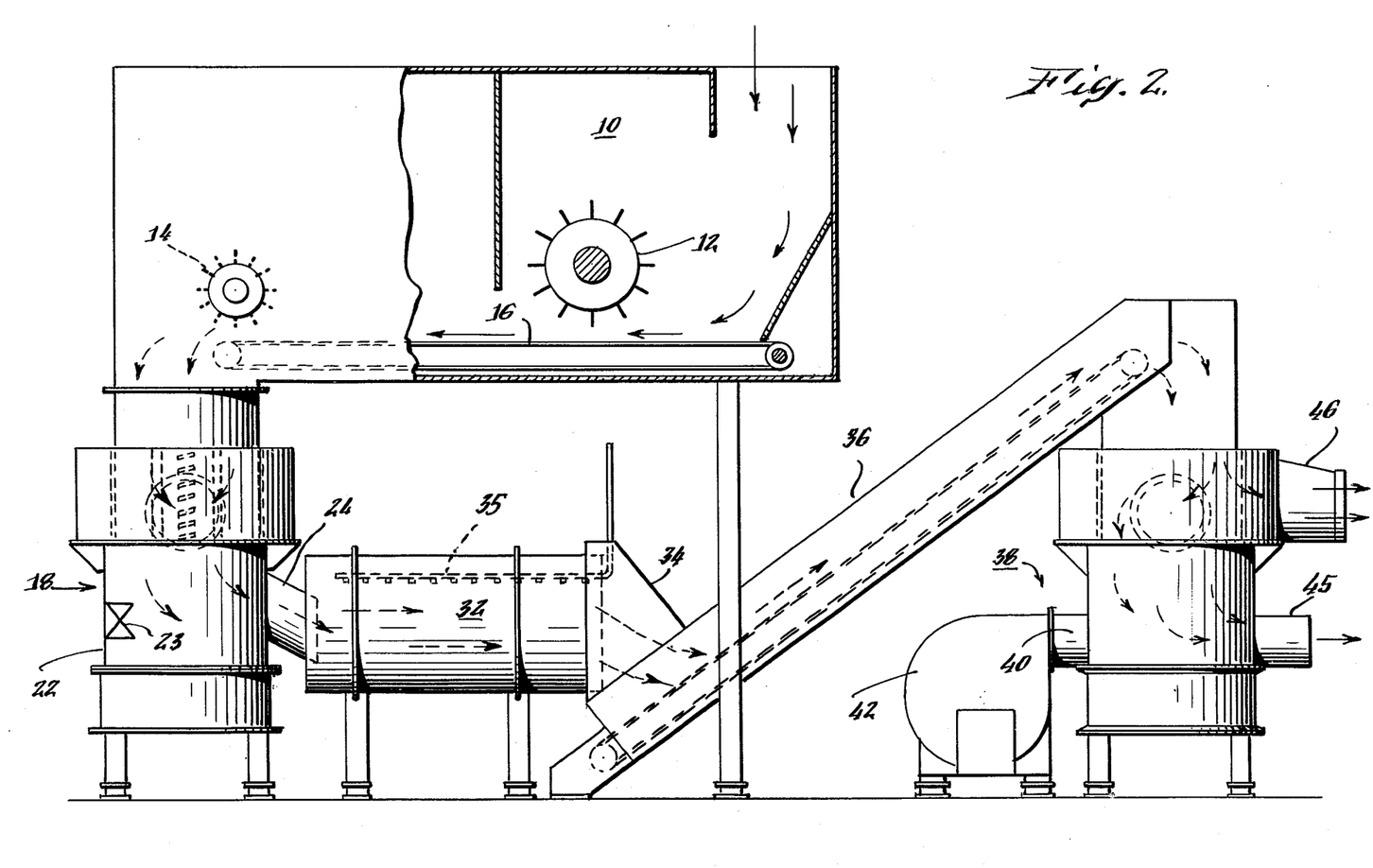
FIG. 2 is a side elevational view of the apparatus of this invention.
Figure 3:
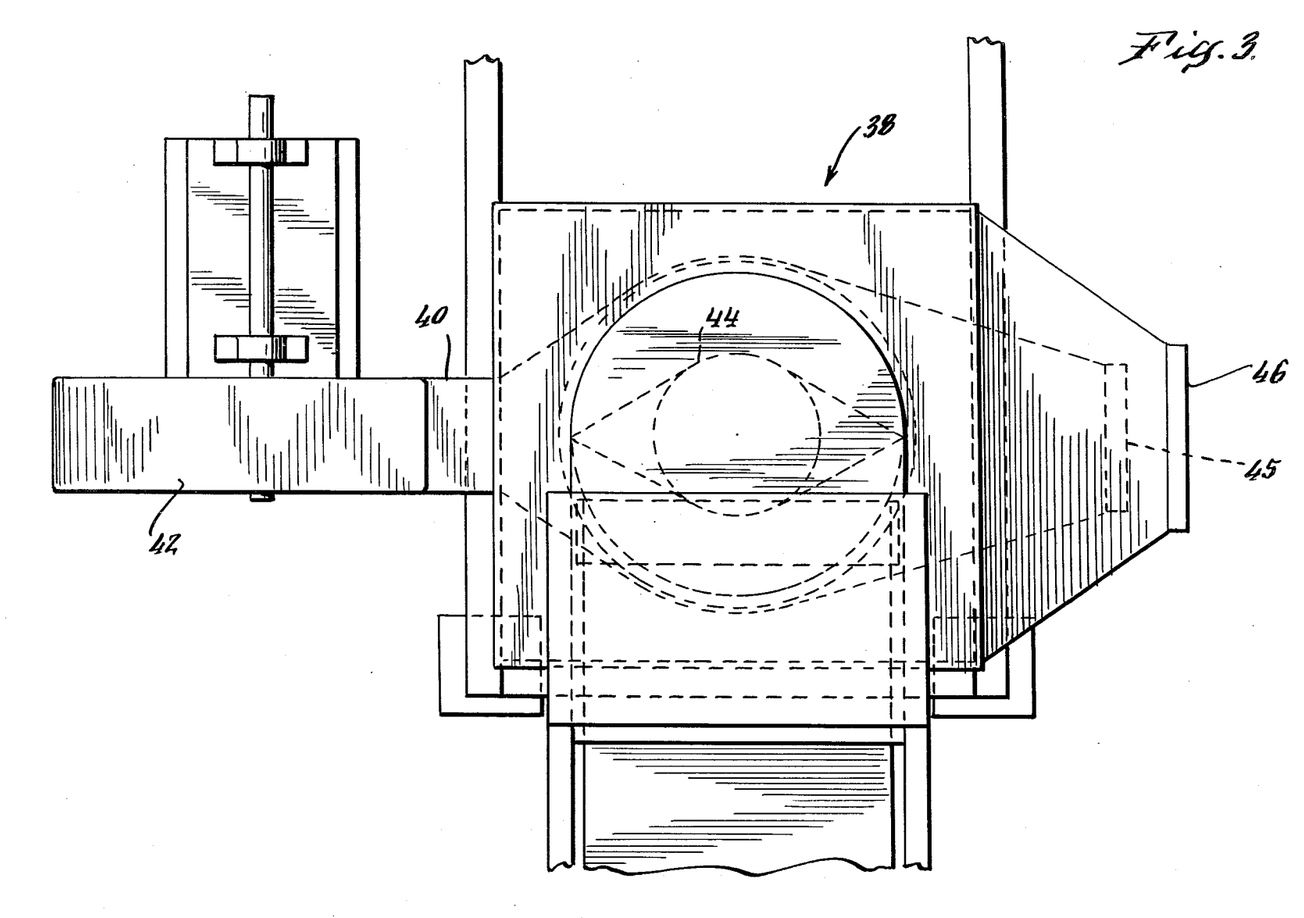
FIG. 3 is a bottom plan view of the rotor chamber shown of FIG. 2.
Figure 4:
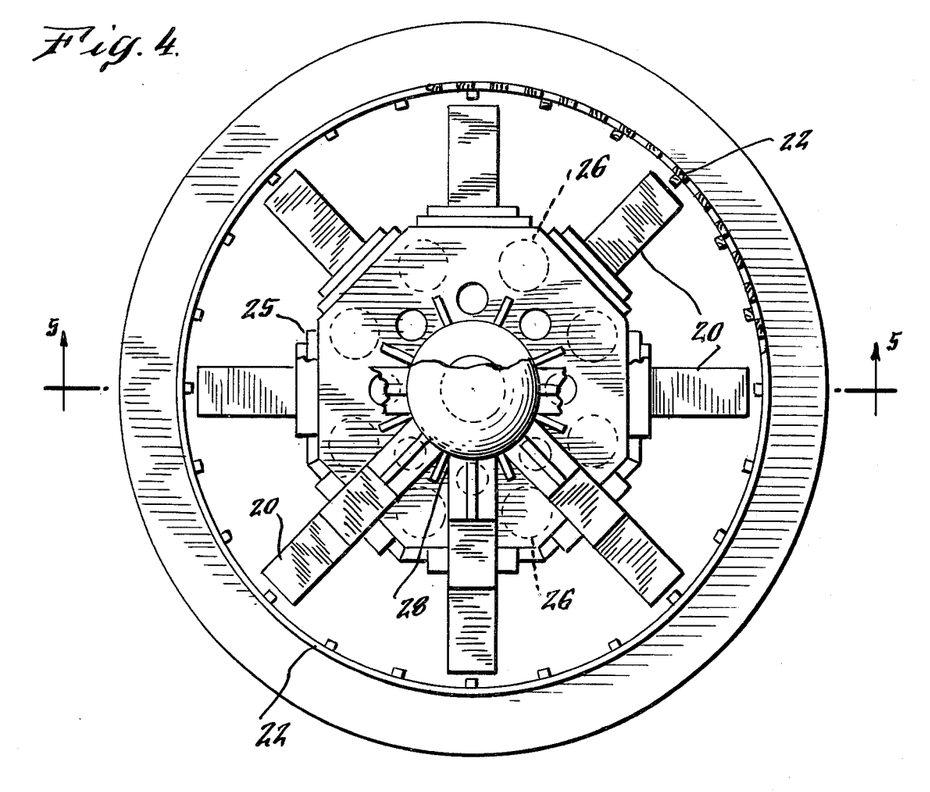
FIG. 4 is a top plan view of the rotor chamber shown of FIG. 2.

The construction of this invention can be more particularly understood in reference to FIGS. 2 to 6. As shown in FIG. 2, infeed head box 10 which is a rectangular container of sufficient size to prevent surging in the first rotor chamber is provided. A size of from 10 to 25 feet in length and 3 to 6 feet wide and 6 to 10 feet has been found sufficient for a rotor chamber of about 36 in. diameter. In-feed rakes 12 and 14 are provided in head box 10 to move a metered amount of feed along conveyor 16 which is located at the bottom of head box 10 and which delivers the feed to the inlet of rotor chamber 18. Rotor chamber 18 is a cylindrical unit. The diameter and the height of the rotor chamber can vary depending on the amount of feed per hour to be processed.

Figure 5:
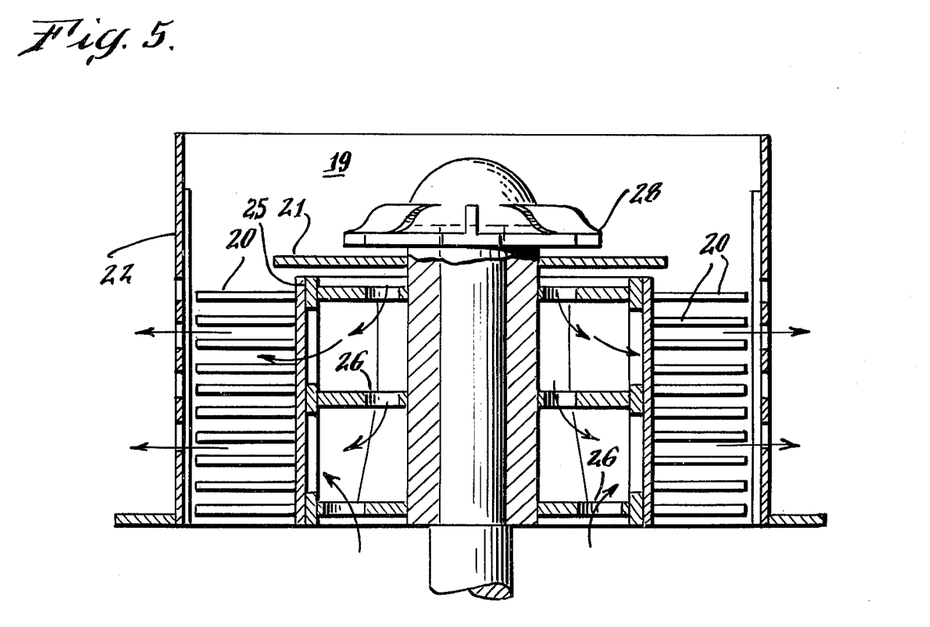
FIG. 5 is a side view of the rotor chamber shown in FIG. 2.
Figure 6:
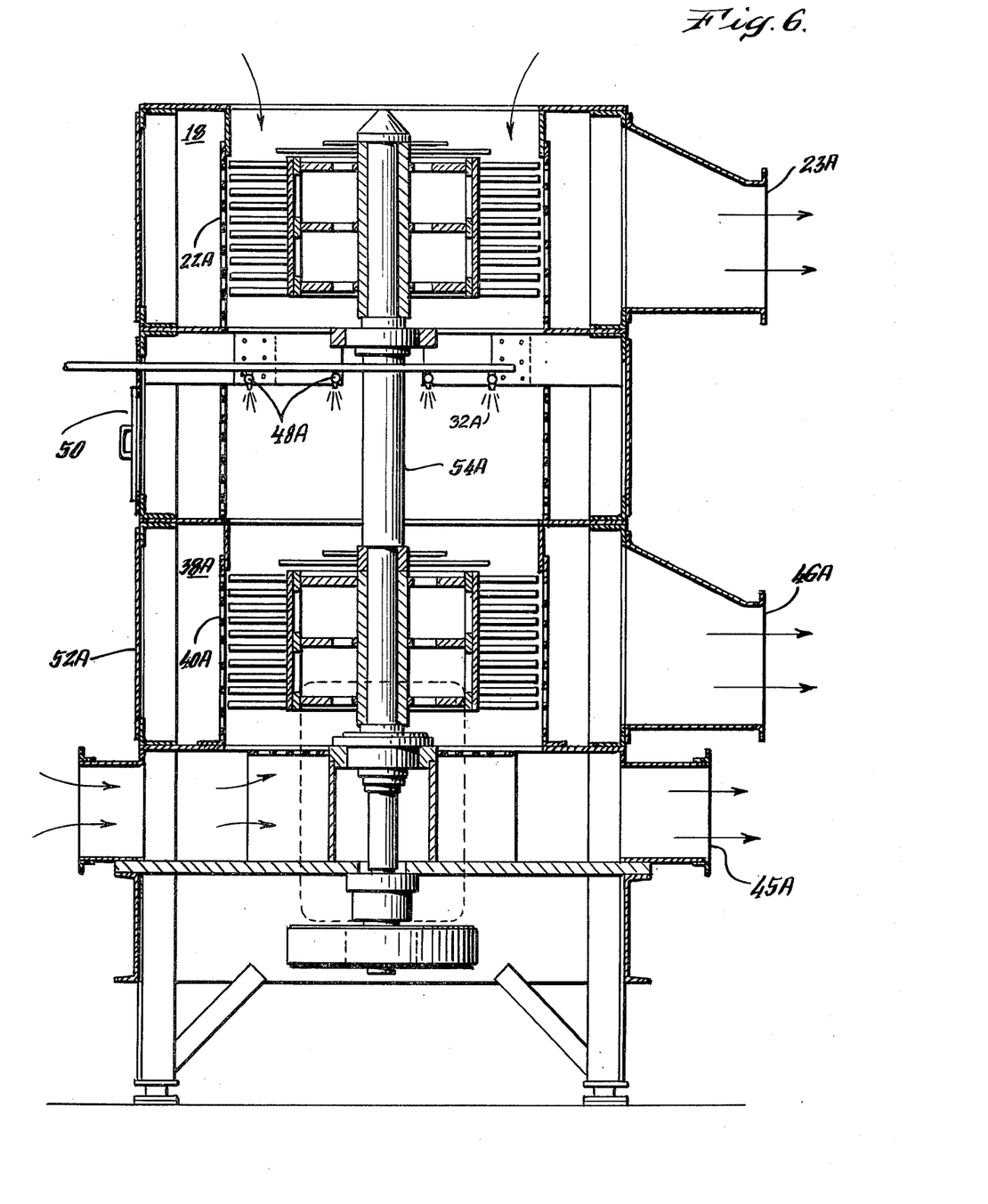
FIG. 6 is a side elevational view of another embodiment of the present invention.

As best seen in FIGS. 5 and 6, the rotor chamber 18 contains a rotor assembly 19. The rotor assembly 19 contains rotor blades 20 and 21. The blades may vary in thickness from about 1/16 of an inch to 1 inch. Preferably in the treatment of MSW, the blades are from 3/16 of an inch to ¾ of an inch thick and are preferentially from ½ to 3/16 of an inch thick. The number of rotor blades can vary and are dependant on the amount of feed processed per hour, the diameter of the rotor chamber and the speed or RPM of the rotor assembly. For a rotor chamber from 36" to 48" in diameter to 8 to 12 sets of parallel rotor blades 20 and 21 spinning at 1000 RPM blade tip speed can be used to process from 14–20,000 lbs per hour of LM-MSW. Two of the rotor blades 21 are shorter than the remaining rotor blades 20 to facilitate feeding into the rotor chamber. There are preferably eight rotor blades in each set. Here again, the number of rotor blades may be varied depending on the desired condition of the feed to be processed. It is contemplated that a variety and greater or a lower number of blades can be used within the scope of the invention. Each set of rotor blades 20 and 21 is propelled by a rotating shaft and secured by a cap, nuts, and flanges in a conventional manner. The rotor core 25 contains air holes 26 for controlled passage of air into the rotor chamber 18. The rotor core contains slots 28 to direct additional air from within the interior of the rotor housing perpendicular to the exterior of the rotor chamber. Optional cutting members 30 which are long sharp vertically spaced blades are located in the interior of the rotor chamber adjacent to the classifier screen 22.

A classifier screen 22, preferentially made of rolled steel, is perforated and welded in a cylindrical pattern surrounding the rotor blades. Duck work further surrounds the classifier screen to form a discharge chute 24 from the rotor chamber. The dimensions of the classifier screen varies with the diameter of the rotor chamber. For example, in a 36 inch diameter rotor chamber it might be considered optimum to employ a classifier screen about 24 in. high. However, such dimensions are entirely determined by the nature of the materials which may be treated by the classifier described herein. The openings in such classifier screen may also be diverse both in size and shape; for example, in the first rotor chamber 18, the openings are normally ¼ inch round holes when processing LW-MSW, but these may be readily adjusted to smaller or larger holes or any different configuration of openings to permit the passing of the materials out of the rotor chamber without blinding. The classifier screen 22 is situated so that there is usually no metal to metal contact between the rotor blades 20 and 21 and the classifier screen 22. Air jets (not shown) may be provided at the exterior of the rotor chamber to direct high pressure air through the discharge duct work in the event there is any blocking.

During operation of the rotor chamber the rotor blades 20 and 21 act as a fan to draw in controlled air which is then directed through slots 28 toward screen 22. The LW-MSW is spun in the chamber against the screen 22 and the cutting blades 30. The heavy small particles fly through the screen 22 and are thus removed from the system, while papers, plastics, and oversize particles are retained for coordinated treatments to complete the classification process.

The processed LW-MSW from rotor chamber 18 has been found to be a good fuel. Thus although it is preferred to process the LW-MSW further to recover the paper fiber, the product of rotor chamber 18 can be immediately used as a low ash fuel.

Discharge chute 24 feeds the classified product from the bottom of rotor chamber 18 into tumbler 32. Fan 23 is located at the side of rotor chamber 18 near the bottom to propell the pressured feed into tumbler 32. Tumbler 32 is a conventional rotary tumbler having showers 35. The LW-MSW is treated with water and other additives by the spray from the showers 35. Moisture content of the LW-MSW is monitored at the tumbler. Sufficient water is added through shower 35 to raise the paper moisture content about 3%–10% by weight and preferrably the paper moisture content of the LW-MSW will be raised to about 25% by weight. Preferrably other additives are incorporated at the tumbler 32. Wetting agents such as ethylene glycol, Igapel, or ZonylA made by DuPont, which reduces surface tension of paper and increases the absorbancy of the paper are added as desirable. In addition detergents and deformers which also promote rapid fiberization of paper components are added to the system. A variety of brightness and paper deinking agents may also be optionally dispersed on the feed.

The wetted LW-MSW is fed by chute 34 to belt conveyor 36. Belt conveyor 36 delivers the LW-MSW to the top of rotor chamber 38. Rotor chamber 38 is similar to rotor chamber 18 except that a suitable blower 42 supplies high velocity air between 4,000 and 10,000 CRM at the bottom of second rotor chamber 38, preferrably at an angle of 90° to the axis of the discharge through the rotor chamber 38. As shown in FIG. 5, a venturi means 44 is optionally provided across the path of the air outlet from the blower 42. During the operation of the second rotor chamber, the blower 42 creates a controllable low pressure region at the lower portion of the rotor chamber to provide a downward force on the descending plastics and oversize LW-MSW. In addition, this high velocity air across the bottom of the rotor chamber prevents the lower rotor chamber from acting as an upward air inlet and furthermore, clears the rotor chamber of rejects and prevents blinding from plastics while sweeping the system clean by sucking materials into the discharge air stream and causing a drying effect on the plastics.

Paper fibers are collected through chute 46 passing through screen 40, and are then sent to a bailing station not shown. Screen 40 is identical to screen 22 including the optional cutting bars except for the holes or openings in the screen. The screen 40 has preferrably somewhat larger holes than does the screen 22, preferrably about ½ inch, smooth edged chauffered holes, although these openings may be adjusted to meet a variety of classification requirements.

The rejected material exists through chute 45 from which it is delivered by suitable means such as a conveyor to a cyclone air classifier 43 of conventional design. The heavy portion is then recovered from the cyclone air classifier and returned to conveyor 36 for recycling in rotor chamber 38. Optionally, water showers (not shown) may be included to bring the moisture content of this heavy paper fraction back to optimal levels before recycling. An electrical moisture sensing means (also not shown) may optionally be used to detect moisture contents since there are significant moisture losses which occur at each stage of the system.

Between 40 to 60 percent by weight of the available paper on a dry basis of the feed is recovered by use of this process. The recovered paper product of the LW-MSW is suitable for the direct repulping into valuable commercial grades of paper fibers.

The plastic produced from cyclone 43 is about 70% plastic and is a valuable plastic product.

In another aspect of this invention, industrial waste which is composed primarily of cardbaord, tape and other packing material and which has a very high Kraft Content is chopped and fed into the first rotor chamber 18. The feed is initially wetted to an EMC of 30 to 40%. During the first rotor chamber treatment, the short paper fibers absorb the added water and are ejected through the first classifier screen 22. The product of rotor chamber 18 enters moisture control chamber 32. Additional moisture is added at 32 where the moisture content is restored to about 25%. In addition, detergents and other wetting agents are added which cause the long Kraft Paper to fiberize the rotor chamber 38.

The fiberized Kraft Paper is recovered through screen 40 while the tape and other light weight contaminants fall to the bottom of rotor chamber 38. The recovered product has a high concentration of Kraft fibers which are long length and high strength fibers. This product is more valuable because of the concentration of long length Kraft fibers and can be directly repulped into Kraft linerboard and Kraft packaging.

Another embodiment of the present invention is shown in FIG. 6. FIG. 6 depicts a vertically stacked single shaft classifier. Here, the LW-MSW is fed into the first rotor chamber 18A through a head box or other suitable feeding means. The first rotor chamber 18A is stacked on top of the second rotor chamber 38A such that the classified feed from 18A falls directly into the second rotor chamber 38A by gravity. Spray showers 48A are provided to allow the addition of the water and other additives such as detergents and wetting agents directly to the classified product of rotor chamber 18A. Thereafter, the LW-MSW is fed by gravity into rotor chamber 38A. Charging port 50A is provided intermediate rotor chamber 18A and 38A to allow recycling of the feed as described in the other embodiment of this invention. Blower 42A is located at the bottom of rotor chamber 38A and functions are described above. Rotor blades in rotor chamber 18A and 38A are driven by a single shaft 52. A single cylindrical casing 52A prevents the loss of any of the feed during its flow from the first rotor chamber 18A to the second rotor chamber 38A.

During operation of this apparatus, the high density, fine fractions are first separated through classifier screen 22A and ejected out through exit 23A. The classified product of rotor chamber 18A falls directly into the additive treating section 32A. Here, the remaining LW-MSW is sprayed with water and other additives to effect optimum moisture and related chemical adjustments in accordance with the invention. The LW-MSW then spirally feeds by gravity at a continuously metered rate into rotor chamber 38A. The classified cellulose fibers spin through the classifier screen 40A and thereafter collected through chute 46A. Paper fiber may be bailed for direct shipment to the paper mill. For maximum paper recovery, the remainder exists through chute 45A and can optionally be grossly separated in cyclone filter again employing my moisture differential and heavy paper portions recycled directly to the showers or my stage 2 rotor chamber.

EXAMPLE 1

5,000 lbs of the light weight fraction of MSW, from the town Brockton, Mass. from which the heavy fraction had previously been removed by a primary shredder and fed into a rotary magnet and through a rotary screen; was chopped to a size of between 2" and 6". The LW-MSW had the following composition:

| Description | Percentage |
| --- | --- |
| Glass grit and stone | 3% |
| Non ferris metals | 1% |
| Rags and textiles | 4% |
| Film plastics | 14% |
| Hard Plastics | 2% |
| Wood | 1% |
| Vegetable matter | 3% |
| Water | 10% |
| Paper | 62% |

Approximately 700 lbs of water was added to the infeed by a water shower along with 50 lbs ethylene glycole as additive. The partially wet LW-MSW was then fed to the first rotor chamber which was 18 inches in diameter and contained 80 rotor blades.

The blades were driven at 1500-2500 rpm. The LW-MSW product of the first rotor chamber was then treated and tumbled wherein 750 lbs. of water was added. The wet LW-MSW was then fed into a second rotor chamber 18 inches in diameter having 80 rotor blades spinning at 1200-1800 rpm 2300 lbs air dry recovered paper product was collected through the second stage classifier screen. It was directly repulped in a Connecticut paper mill and used on a production paper machine to make excellent grade fiber board for folding cartons equal to or better than present commercial grades. The recovered paper contained less than about 2% plastic and approximately 3% ash content by weight with approximately 84% of the fiber when repulped holding on a 100 mesh screen as opposed to only 74% of the normal commercial paper pulp holding on a 100 mesh screen.

EXAMPLE 2

Old Corrugated Boxes

Old corrugated boxes, a leading commodity in the secondary fiber industry, are normally obtained from super markets and shredded by paper stock dealers, while some old corrugated may be derived from sources such as container manufacturers selling trims and edge clippings as developed in volume. Such trim and edge clippings are to be preferred. However, it is important that boxes as in old corrugated boxes must be shredded to a small size prior to introduction to two-phase classification and prepulping treatment of such used paper stocks. Chopping and shredding is important in that the size of this material must be reduced to a particle size of approximately two to three inches. Strips in widths of about 2" by long lengths may be acceptable to feeding as these are quickly broken into proper lengths at the first stage. The purpose of such old corrugated secondary fiber processing is two fold: to reduce horsepower consumption at the pulper, in the paper mill, and to reduce the usual long fiber reduction cycles for Kraft. These cycles frequently approach one hour in batch-pulpers and employ excessive horsepower in the early phase of wet pulp reduction; and to eliminate undesirable short fiber fractions prior to any paper mill pulping in order to obtain improved long fiber kraft pulps. Elimination of the corrugated fluted medium a short-fibered material having deleterious and negative values, when recycling of old corrugated, is a special advantage. Proceeding with small batches of previously chopped up pieces of old corrugated boxes as received at the paper mill in random samples, my test materials were soaked under extremes of moisture conditions. It was observed that water was shed from the surfaces of the outside liners as these hard surfaces frequently were water-resistant. However, moisture was rapidly absorbed by the corrugated fluted medium and such medium became promptly softened. In fact, the entire laminate of the wet corrugated board consisting of a top liner became easily delaminated often prior to introducing to the test classifier. The first stage of the classifier action was important at this treating zone where the wet short fiber medium was extracted through the ¼" screen plates and separated from the Kraft liners. The liner portion of long-fibered Kraft paper was retained in excellent condition for the ongoing second stage whereby the oversize pieces were vigorously flexed and chopped to a size to pass through the ½" second-stage screen. Thus, 80 to 85% of a uniformly processed Kraft fiber product was retained having high physical and mechanical properties. Oversized pieces which did not yield to the treatment as described in stage one were rewet and recycled in the same system. The reject fraction of the first stage, 12% to 15% by weight, was collected separately for use with other grades of paper or paperboard. Net overall losses in the system were less than 5% by weight from tapes and extraneous contaminants. The cycle times for Kraft re-pulping were reduced up to 50%, and effluent pollution significantly improved.

EXAMPLE 3

Experimentation Examples

Old News:

A series of tests employed old newspapers for purposes of reduction of ink contaminents, prior to de-inking of such old newspapers and restoration of the ground wood fiber. Fifty pounds of mixed newspapers, mostly newsprint with some coated inserts, were employed for these trial batches. The newsprint was reduced in size more quickly by the first rotor, especially after adding 10%-12% moisture to bring up the moisture content to about 20%. At lower levels of moisture, the inks would not release as quickly and effective scaling of surfaces with minimum loss of fibers was substantially improved at moisture levels of 25%. However, this was balanced by losses in fiber and an optimum moisture content was found to be at 18% to 22% O.D. basis. Ink removal was observed to be at an estimated 40-50% of print on surfaces of the old news. Printing inks were initially removed through flaking off and by scraping the paper against the sharp edges of holes in the screen plates. Incidental fiber losses were in direct proportion to the moisture content. In addition to removal of inks, fiber structures were opened and substantially exposed for purposes of improved dispersion and brightening. The second stage classification through the ½" screen provided a consistent and uniform size particle advantageous for optimum de-inking and/or bleaching controls without oversized extraneous materials present. Coated and wet strength papers are a frequent cause of contamination in news. However, my method, as described in these experiments, also provided visible destruction of surface coatings to a degree which permitted many ground wood coated stocks to be prepared with a minimum of contamination. The brightness of the old news was quickly increased through my pre-pulper classification stages to 40-45 Brightness from original levels of about 30 Brightness in these experiments.

A number of mixed ground wood and old news test samples were employed for experimental re-pulping and de-inking. A method of pulping was devised and demonstrated at the laboratories of Bolton-Emerson Pulp and Paper Research Center, Lawrence, Mass., whereby commercial detergent was added directly to the pulper to clean the fiber and develop a controlled foam. The brightness of such pulps from old news improved immediately. With this amplification of flotation removal of foam from the surface of pulper stock, a modified flotation repulping was accomplished using the pulper stock flows. The brightness of such old newsprint pulps reaches about 52 Brightness. However, improved brightness of up to 60 or better was obtained on repeated flotation treating for improved de-inking employing an added 2% hydrogen peroxide. This modified flotation method as disclosed hereby yielded a high brightness fiber fully suitable for newsprint. Losses in the prep-pulper classification stage were 12%. However, additional losses occurred through repulping with flotation using detergent de-inking as noted. The latter averaged an additional 18% to 20% loss of fiber with removal of foam laden inks as skimmed from the surface of the pulper using a deflector to a discharge port.

It should be understood by those skilled in the art that wide and various modifications may be made in my present invention without departing from the intent and are specifically the scope thereof, as described in the specification and defined in the appended claims, as described in the specification and defined in the appended claims, and used in demonstrations and commercial practice in production plants at the numerous waste resources recovery facilities at Brockton, Mass. for the recovery of the commercial grade paper product shown here having technical characteristics in keeping with the specific objectives of quality through my techniques as disclosed herein constituting a new process in the conversion of garbage into process of paper fibers. My invention may be used for further classifications of materials having diverse industrial and agricultural usage when upgraded through my process techniques altogether encompassed within the scope of these inventions disclosed herein.

What I claim is:

1. A process for reclaiming low density moisture absorbent materials from a material mixture, comprising:
    inputting a material mixture containing high and low density moisture inabsorbent and low density moisture absorbent materials
    selectively and controllably applying moisturizers to said material mixture and increasing the moisture content of said material mixture to a predetermied value to moisturize said low density absorbent materials and increase the weight and density thereof to form high density moisturized materials and a moisture weighted material mixture;
    establishing a centrifugal field and segregating said moisture weighted material mixture in said field to produce a high density fraction and a low density fraction;
    partially fiberizing said high density moisturized materials to selectively reduce the size thereof;
    separating said segregated high density fraction into an oversize and an undersized fraction; and collecting the undersized fraction as recovered product and discharging the oversized fraction as an unreclaimed product.

2. The process of claim 1 further comprising:
    selectively removing the low density fraction from the centrifugal field by creating controlled axial air streams within the centrifugal field.

3. The process of claim 2 wherein said axial controlled air streams are created in said centrifugal field by inducing a low pressure region at the bottom of said centrifugal field thereby creating said axially directed air streams through the center portion of said field to extract lightweight nonrefined discarded materials.

4. The process of claim 3 wherein said lightweight and nonrefined discarded materials are introduced in a cyclone classifier to be cleaned of lightweight plastic materials by feeding said mixture to a moisture control section for selectively and controllably increasing the moisture content of said mixture to a predetermined value for increasing the weight and moisture content of said nonrefined materials for forming a moisture weighted mixture;
    feeding said moisture weighted material mixture into a centrifugal field for fiberizing and segregating said weighted and moisturized materials of said moisturized weighted mixture;
    subjecting at least part of said centrifugally segregated and fiberized weighted and moisturized materials to an abrasion means for additionally fiberizing said materials;
    propelling said abraded centrifugally segregated fiberized, weighted and moisturized materials against a classifier means for discharging therethrough undersized centrifugally segregated and fiberized weighted and moisturized materials.

5. The process of claim 3 wherein said lightweight and nonrefined discarded materials are introduced in a cyclone classifier to be cleaned of lightweight plastic materials by selectively and controllably applying moisturizers to said materials for increasing the moisture content of said materials to a predetermined value to increase the weight and moisture of said nonrefined materials to form a moisture weighted material mixture;
    subjecting said moisture weighted material mixture to reduction forces to fiberize and refine said moisturized materials to a predetermined size;
    separating refined and fiberized moisturized materials from said mixture as a recovered product.

6. The process of claim 1 wherein said segregating of said moisture weighted material mixture is accomplished by centrifugally suspending said low density moisture absorbent material in a central portion of said field and displacing said high density inabsorbent and high density moisturized materials in a peripheral portion of said field.

7. The process of claim 1 further comprising separating said unreclaimed oversized fraction into a high density fraction and into a low density fraction; controlling the water content of the high density fraction; to a predetermined level and mixing the water controlled high density fraction with said moisture weighted material mixture in said centrifugal field.

8. The process of claim 7 wherein the moisture content of said material mixture is controlled to between 20 and 35 percent.

9. The process of claim 7 wherein the moisture content of said moisture weighted material mixture is controlled at 25 percent.

10. A process for the recovery of cellulose fibers from LW-MSW comprising:
(a) cutting the LW-MSW to a size between 2" and 6";
(b) segregating the LW-MSW in a centrifugal field into a high density fraction and a low density fraction;
(c) removing the heavy undersized contaminants including grit, glass and vegetable matter from the cut, segregated LW-MSW;
(d) controlling the moisture content of the decontaminated LW-MSW to a predetermined level;
(e) partially fiberizing the paper fraction of the moisture controlled LW-MSW to selectively reduce the size of the paper;
(f) segregating the LW-MSW in a centrifugal field into a high density fraction and a low density fraction;
(g) separating said centrifugally segregated high density fraction into an oversized and undersized fraction; and collecting the undersized fraction as recovered product;
(h) selectively removing the low density fraction from said centrifugal field by inducing a controlled air stream within said centrifugal field.

11. The process of claim 10 wherein the controlled air streams are formed by inducing a low pressure region at the bottom of the centrifugal field thereby creating a downward air flow through a central portion of said centrifugal field.

12. The process of claim 11 wherein the moisture content is controlled to a level between 20 and 35 percent.

13. The process of claim 12 wherein the moisture content is controlled to a level of approximately 25 percent.

14. The process of claim 10 wherein in step g the undersized fraction is separated from the oversized fraction by screening.

15. An apparatus for separating cellulose fiber from a chopped paper-plastic mixture comprising:
(a) means to control the moisture content of the paper-plastic mixture;
(b) means to partially fiberize the paper fraction of the mositure controlled paper plastic mixture;
(c) means to induce a centrifical field to separate the paper-plastic mixture into a high density region and a low density region;
(d) screen means surrounding the centrifical field means adapted to segregated the undersized fraction of the high density fraction from the oversized fraction;
(e) means to collect the segregated undersized fraction.

16. The apparatus of claim 15 further comprising:
(f) means to create directed air streams in the centrifical field to selectively remove the low density fraction.

17. An apparatus for separating cellulose fiber from a chopped paper-plastic mixture comprising:
(a) means to control the moisture content of the paper-plastic mixture;
(b) a rotor chamber is communication with said moisture control means to partially fiberize the paper component of the paper-plastic mixture and to induce a centrifical field to separate the paper-plastic mixture into a high density fraction and a low density fraction;
(c) a classifier screen surrounding the rotor chamber and adapted for the passage of the partially fiberized paper fraction of the paper mixture;
(d) means to collect the partially fiberized paper passing through the classifier screen;
(e) a blower at the bottom of said rotor chamber to create a low pressure area within said centrifical field to induce a downward force on the low density fraction in the rotor chamber;
(f) venturi means incommunication with said blower to intensify the downward force induced by the blower;
(g) means to collect the paper-plastic mixture from the bottom of the rotor chamber.

18. The apparatus of claim 17 wherein the classifier screen has between $\frac{3}{4}$ and $\frac{1}{4}$ inch diameter holes.

19. The apparatus of claim 17 further comprising means to direct air from the interior of the rotor chamber in the direction of the classifier screen.

20. A process for treating and separating a mixture of municipal solid waste comprising:
feeding said mixture to a first reduction means for chopping and screening substantially all the heavy materials and metals from the mixture to leave a residual mixture comprising high and low density inabsorbent materials and low density absorbent materials;
feeding said residual mixture to a first rotor chamber and subjecting said mixture to ballistic attrition for removing residual gross contaminants;
feeding said decontaminated residual mixture to a moisture control section for selectively and controllably increasing the moisture content of said decontaminated residual mixture to a predetermined value for increasing the weight and mositure content of said low density absorbent materials for forming a moisturized weighted mixture;
feeding said moisturized weighted mixture into a second centrifugal field for fiberizing and segregating said weighted and moisturized absorbent materials of said moisturized weighted mixture;
subjecting at least part of said centrifugally segregated and fiberized weighted and moisturized absorbent materials to an abrasion means for additionally fiberizing said materials;
propelling said abraded centrifugally segregated and fiberized weighted and moisturized absorbent materials against a classifier means for discharging therethrough undersized centrifugally segregated and fiberized weighted and moisturized materials.

21. The process of claim 20 further comprising inducing a low pressure area below said centrifugal field to induce downward forces on the low density fraction for extracting lightweight and nonrefined material as a discarded material.

22. The process of claim 21 wherein said lightweight and nonrefined discarded materials are introduced in a cyclone classifier to be cleaned to lightweight plastic materials by feeding said mixture to a mositure control section for selectively and controllably increasing the moisture content of said mixture to a predetermined value for increasing the weight and moisture content of said nonrefined materials for forming a moisture weighted mixture;

feeding said moisture weighted mixture into a centrifugal field for fiberizing and segregating said weighted and moisturized materials of said moisturized weighted mixture;

subjecting at least part of said centrifugally segregated and fiberized weighted and moisturized materials to an abrasion means for additionally fiberizing said materials;

propelling said abraded centrifugally segregated and fiberized weighted and moisturized materials against a classifier means for discharging therethrough undersized centrifugally segregated and fiberized weighted and moisturized materials.

23. The process of claim 21 wherein said lightweight and nonrefined discarded materials are introduced in a cyclone classifier to be cleaned of lightweight plastic materials by selectively and controllably applying moisturizers to said materials for increasing the moisture content of said materials to a predetermined value to increase the weight and moisture of said nonrefined materials to form a moisture weighted material mixture;

subjecting said moisture weighted material mixture to reduction forces to fiberize and refine said moisturized materials to a predetermined size;

separating refined and fiberized moisturized materials from said mixture as a recovered product.

24. An apparatus for reclaiming fibrous materials from a mixture of materials containing high and low density inabsorbent materials and low density absorbent materials comprising:

means for receiving said mixture for selectively and controllably increasing the moisture content of said mixture to a predetermined value by moisturizing said mixture and increasing the weight of said low density moisture absorbent materials for forming a moisture weighted mixture containing high density moisture absorbent materials;

means for inducing a centrifugal field in said moisture weighted material mixture for at least partially fiberizing said high density moisture absorbent materials and segregating said material into high and low density fractions;

means for selectively passing an undersized portion of said high density moisture absorbent materials to output.

25. The apparatus of claim 24 further comprising density separation means to separate the paper-plastic mixture from the bottom of the rotor chamber into a high density and a low density fraction; means to recycle said high density fraction to the moisture control means.

26. The apparatus of claim 25 wherein the density separation means is a cyclone classifier.

27. The apparatus of claim 26 comprising heavy contaminant removal means to remove small high density contaminents such as grit, glass and vegetable matter from the paper-plastic moisture before moisture control means.

28. The apparatus of claim 27 wherein heavy contaminant removal means comprises a rotor chamber; a heavy contaminant classifier screen adapted for the passage of small heavy contaminants.

29. The apparatus of claim 28 wherein the heavy contaminant claims has holes between $\frac{1}{8}$ and $\frac{1}{2}$ in diameter holes.

30. The apparatus of claim 24 further comprising a means for abrading said high density materials segregated in said centrifugal field.

31. The apparatus of claim 24 wherein said means for selectively passing at least a portion of said moisturized and fiberized weighted absorbent materials to output comprises a screen at least partially surrounding said rotor chamber.

32. The apparatus of claim 24 further comprising means for establishing a low pressure area for creating axial air streams within a central portion of said field and extracting low density materials suspended in said centrifugal field.

33. The apparatus of claim 32 wherein said low pressure flow is created by a venturi means in communication with said chamber.

34. The apparatus of claim 24 wherein said means for inducing a centrifugal field comprises a rotor chamber having spinning shaft and series of rotor blades radially disposed therefrom.

* * * * *